(12) United States Patent
Kawai

(10) Patent No.: US 8,948,047 B2
(45) Date of Patent: Feb. 3, 2015

(54) DEVICE MANAGING APPARATUS AND PROGRAM THEREOF

(75) Inventor: Sunao Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1495 days.

(21) Appl. No.: 12/339,868

(22) Filed: Dec. 19, 2008

(65) Prior Publication Data

US 2009/0168668 A1     Jul. 2, 2009

(30) Foreign Application Priority Data

Dec. 27, 2007    (JP) ................................. 2007-336423

(51) Int. Cl.
     *H04L 12/28*      (2006.01)
     *H04L 12/24*      (2006.01)

(52) U.S. Cl.
     CPC ............ *H04L 41/22* (2013.01); *H04L 41/0893* (2013.01); *H04L 41/145* (2013.01); *H04L 41/14* (2013.01)
     USPC ........... 370/254; 370/241; 370/255; 709/220; 709/221; 709/223; 709/224; 709/226; 715/735; 715/736

(58) Field of Classification Search
     None
     See application file for complete search history.

(56) References Cited

U.S. PATENT DOCUMENTS

| | | | | |
|---|---|---|---|---|
| 7,373,411 | B2* | 5/2008 | Robinson ....................... | 709/230 |
| 2004/0046786 | A1* | 3/2004 | Tanimoto ....................... | 345/736 |
| 2005/0048953 | A1* | 3/2005 | Ohara .......................... | 455/412.1 |
| 2005/0099962 | A1* | 5/2005 | Matsuda ....................... | 370/254 |

FOREIGN PATENT DOCUMENTS

| | | |
|---|---|---|
| EP | 1104132 | 5/2001 |
| JP | 2000-194628 | 7/2000 |
| JP | 2001-154967 | 6/2001 |
| JP | 2004-102558 | 4/2004 |

OTHER PUBLICATIONS

European Search Report; Application No. 08254047.7-2416; Dated Mar. 12, 2009.

* cited by examiner

*Primary Examiner* — Faruk Hamza
*Assistant Examiner* — Aixa A Guadalupe-Cruz
(74) *Attorney, Agent, or Firm* — Banner & Witcoff, Ltd.

(57) ABSTRACT

A device managing apparatus that can easily communicate under a proper communication configuration, through a network may be provided. A managing apparatus is provided with a storage and a controller (management program). The storage stores multiple different communication configurations. The controller controls the communication with the device. The controller carries out the following processes: (1) repeating a communication trial toward the device using one of stored communication configurations that are stored in the device managing apparatus, in which the communication configuration to be used is changed for each communication trial; (2) monitoring a response which is sent to the device managing apparatus from the device in a case where the communication trial has succeeded; and (3) displaying a plurality of areas, each of which is linked to each of the stored communication configurations; and displaying a symbol image representing the device in the area that is linked to the communication configuration with which the communication trial has succeeded. By using the device managing apparatus, the user can easily recognize, at a glance of the screen, devices at which the same communication configurations are set.

12 Claims, 8 Drawing Sheets

DEVICE MANAGING APPARATUS AND PROGRAM THEREOF

CROSS-REFERENCE TO RELATED APPLICATION

This application claims priority to Japanese Patent Application No. 2007-336423, filed on Dec. 27, 2007, the contents of which are hereby incorporated by reference into the present specification.

BACKGROUND OF THE INVENTION

1. Field of the Invention

The present invention relates to a device managing apparatus for managing through a network a device that is capable of communicating under a proper communication configuration, and program thereof.

2. Description of the Related Art

A technique for managing a device connected to a network is known. The "device" in this specification refers to a device which is connected to a network, such as a printer, a facsimile and a copy machine. In this specification, equipment for managing such a device is called "device managing apparatus" or merely "managing apparatus." For example, Japanese Patent Application Publication No. 2001-154967 discloses a managing apparatus which efficiently manages multiple devices.

BRIEF SUMMARY OF THE INVENTION

A managing apparatus and a device communicate with each other in accordance with a specified communication protocol (for example, an SNMP: Simple Network Management Protocol). In order to establish communication, a proper communication configuration is required for each of the managing apparatus and the device.

Among communication protocols, a communication protocol which allows mutual communication between the managing apparatus and the device only in a case where communication configurations of the managing apparatus and the device correspond to each other exists. For example, communication configurations which are called as a user name, an authentication key, an encryption key, and a context are used in an SNMPv3 (Simple Network Management Protocol Version3). The encryption key includes public key and private key. Without correspondence between a public key (or a private key) possessed by the managing apparatus and a private key (or a public key) possessed by the device, communication cannot be established.

A default communication configuration is set at each of the devices in advance. Each device can change its own communication configuration. The communication configurations can be individually set to each device. Therefore, it is preferable that, in a case where a single managing apparatus manages multiple devices, the user of the managing apparatus can easily recognize the relationship between each of the devices and corresponding communication configuration thereof. In this specification, a technique for facilitating the management of communication configurations of multiple devices which are connected to a network is provided.

A technique disclosed in the present specification provides a novel managing apparatus (device managing apparatus). The managing apparatus is provided with a storage and a controller. The storage stores multiple communication configurations that are different from each other. The multiple communication configurations may be input typically by the user. The controller controls the communication with the device. The controller executes the following processes:

(1) Repeating a communication trial toward the device by using one of communication configurations that are stored in the device managing apparatus, whereas the communication configuration to be used is changed for each communication trial.

(2) Monitoring a response which is sent to the device managing apparatus from the device in a case where the communication trial has succeeded; and (3) Displaying a plurality of areas, each of which is linked to each of the stored communication configurations; and displaying a symbol image representing the device in the area that is linked to the communication configuration with which the communication trial has succeeded.

The "symbol image" may typically be a so-called icon. The "communication configuration" may be a security-related communication configuration which includes at least one of the information among a user name, an authentication key, an encryption key, and a context. The "area" may be a so-called "window," which is displayed on a screen.

The managing apparatus described above may repeat a communication trial by alternately using each and every stored communication configurations, and specify a device which has responded to the respective communication trial. The communication configuration with which the communication trial has succeeded may be specified as the communication configuration of the corresponding device. The managing apparatus may display the symbol image representing the specified device in a display area that is linked to the communication configuration with which the communication trial has succeeded. In other words, the managing apparatus may automatically group and accordingly display devices having the same communication configuration. The managing apparatus enables, through the screen, easy and immediate recognition by the user of the devices having the corresponding communication configuration. The number of the device to be managed by the managing apparatus may be one, two or more.

The technique disclosed in the present specification may be embodied as a computer program. According to a technique disclosed in the present specification, a display area (window) is displayed as to each of the stored communication configurations. In addition, symbol images, which represent respective devices, among the devices connected to a network, that are capable of responding with each communication configuration, is displayed in the respective corresponding areas. The managing apparatus displays devices in a manner that the devices having the mutual communication configuration are grouped, and thereby facilitates the management of the devices.

DETAILED DESCRIPTION OF THE INVENTION

Figure 1:
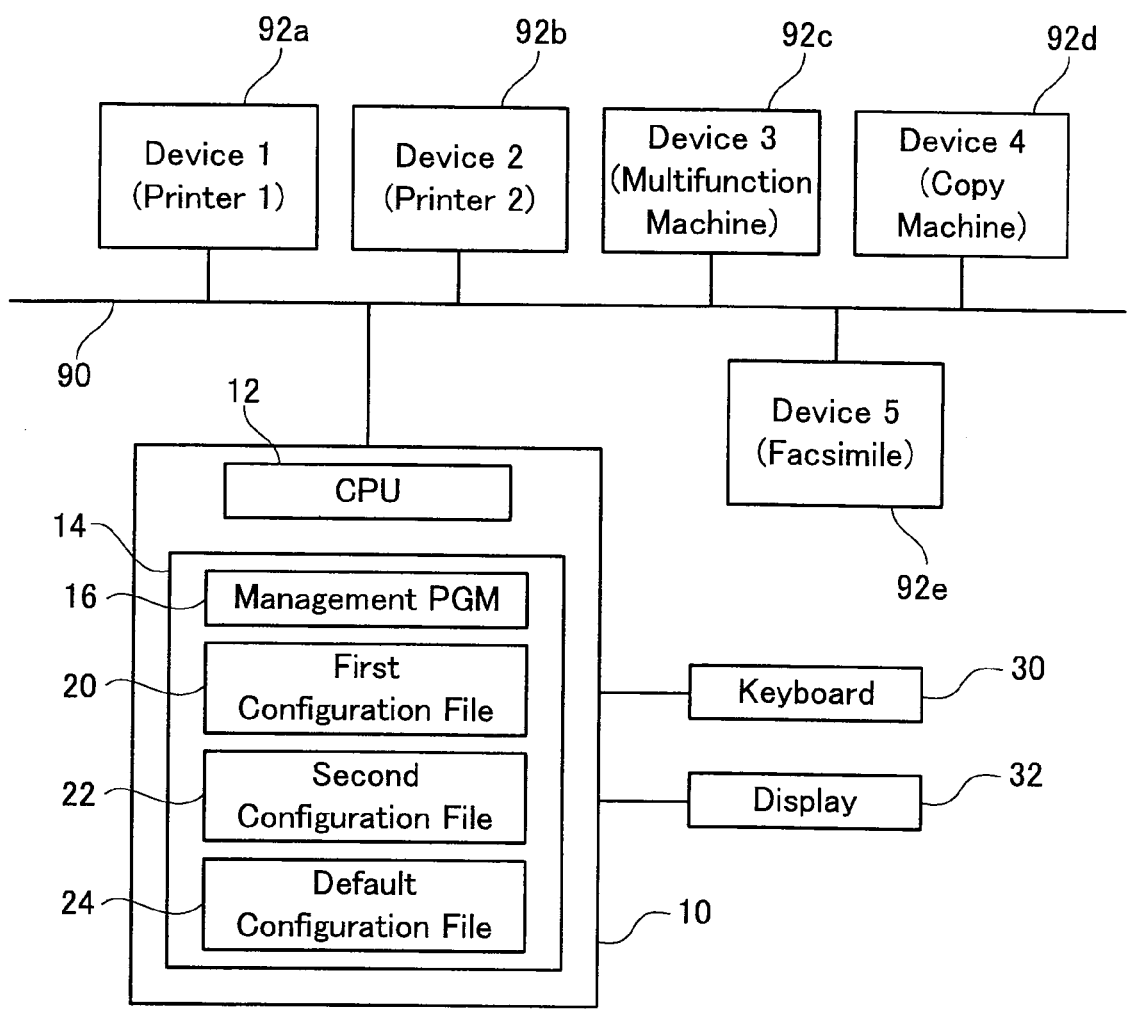
FIG. 1 is a schematic block diagram showing a managing apparatus.

An embodiment of a device managing apparatus preferred with the present invention will be described with reference to the accompanying drawings. A device managing apparatus 10 is connected to a network 90. Hereinafter, "a device managing apparatus 10" will be simply referred to as "a managing apparatus 10." Five network devices 92a, 92b, 92c, 92d, and 92e are connected to the network 90. The network device 92a is a printer. The network device 92b is a printer which is different from the printer 92a. The network device 92c is a multifunction machine having a printing function, a copying function, and a scanning function. The network device 92d is a copy machine. The network device 92e is a facsimile machine. Hereinafter, the network devices 92a, 92b, 92c, 92d, and 92e are referred to as device 1, device 2, device 3, device 4, and device 5, respectively. In the embodiment below, devices which already have been managed by the managing apparatus 10 are the devices 1 to 4. The device 5 is a device which has not yet been subjected to the control of the managing apparatus 10.

The managing apparatus 10 is provided with a CPU 12 and a storage 14. A keyboard 30 and a display 32 are connected to the managing apparatus 10. A mouse (not shown in the drawings) for operating an image (icon or the like) on a screen of the display is connected to the managing apparatus 10.

The managing apparatus 10 and each device can establish a mutual communication in accordance with SNMPv3 (Simple Network Management Protocol Version3). In order to establish the communication between two devices (i.e. one of the devices and the managing apparatus) in accordance with the SNMPv3, a corresponding communication configuration is required. For example, the communication configuration includes such items as a user name, an authentication key, an encryption key, and a context. The "corresponding communication configuration" means that an association of, for example, the private key and the public key for encryption having been established. Hereinafter, the "corresponding communication configuration" may be referred to as the "mutual communication configuration" in convenience of explanation. More specifically, the communication between the managing apparatus 10 and each device can be established only when the "mutual communication configuration" is set, respectively.

The communication configurations can be individually set to each device. Accordingly, mutual communication configuration with that of the device is required for the managing apparatus 10. The communication configuration is stored as a file in the storage 14. As shown in FIG. 1, the storage 14 stores a default configuration file 24 as a communication configuration, with which the managing apparatus 10 communicates with each device. Especially in a case where no set value is specified, the managing apparatus 10 tries to communicate with each device in accordance with the communication configuration which is stored in the default configuration file 24. Further, the storage 14 stores a first configuration file 20 into which a first communication configuration is described and a second configuration file 22 into which a second communication configuration is described. These configuration files can be modified on demand by the user's operation of a keyboard or a mouse. Further, a new communication configuration can be added into the aforesaid plurality of communication configurations by the user.

In the communication configuration set by the devices, there are some configuration items which a common communication configuration cannot be set due to the characteristics of the devices even in a case where the devices are managed by the same user. In a case where a different communication configuration is set to each device, there is a possibility that the default communication configuration set at the managing apparatus 10 may not suffice to communicate with all the devices. To solve the problem of diversity in the communication configuration among the devices, the managing device 10 carries out communication with the respective devices subject to the management by adding new files to utilize the respective communication configuration as described in the added files. Additionally, configuration items which have different settings from that of the default configuration may be written into each of the added configuration files. In this case, as to an item which has a communication configuration common to the default, a communication trial toward the device can be made in accordance with the default communication configuration file. In other words, there may be a case where the managing apparatus 10 completes a single communication configuration, by utilizing a combination of the default communication configuration file and a newly-added, individual communication configuration file.

Further, the storage 14 stores a management program 16 to be executed by the CPU 12. Execution of the management program 16 by the CPU 12 realizes functions of the managing apparatus 10. The CPU 12 executing the management program 16 may be referred to as a "controller" of the managing apparatus 10. Note that a reference symbol "PGM" shown in FIG. 1 represents a "program."

Main processes described in the management program 16 will be explained. The managing apparatus 10 (management program 16) receives user's instructions which are input by means of an input device, such as the keyboard 30 and the mouse. Typical instructions of users are: input of a communication configuration, a movement of an icon on the screen, and the like. The management program 16 writes the first communication configuration and the second communication configuration to be input by a user into the first configuration file 20 and the second configuration file 22, respectively, to preserve these configuration files.

Figure 2:
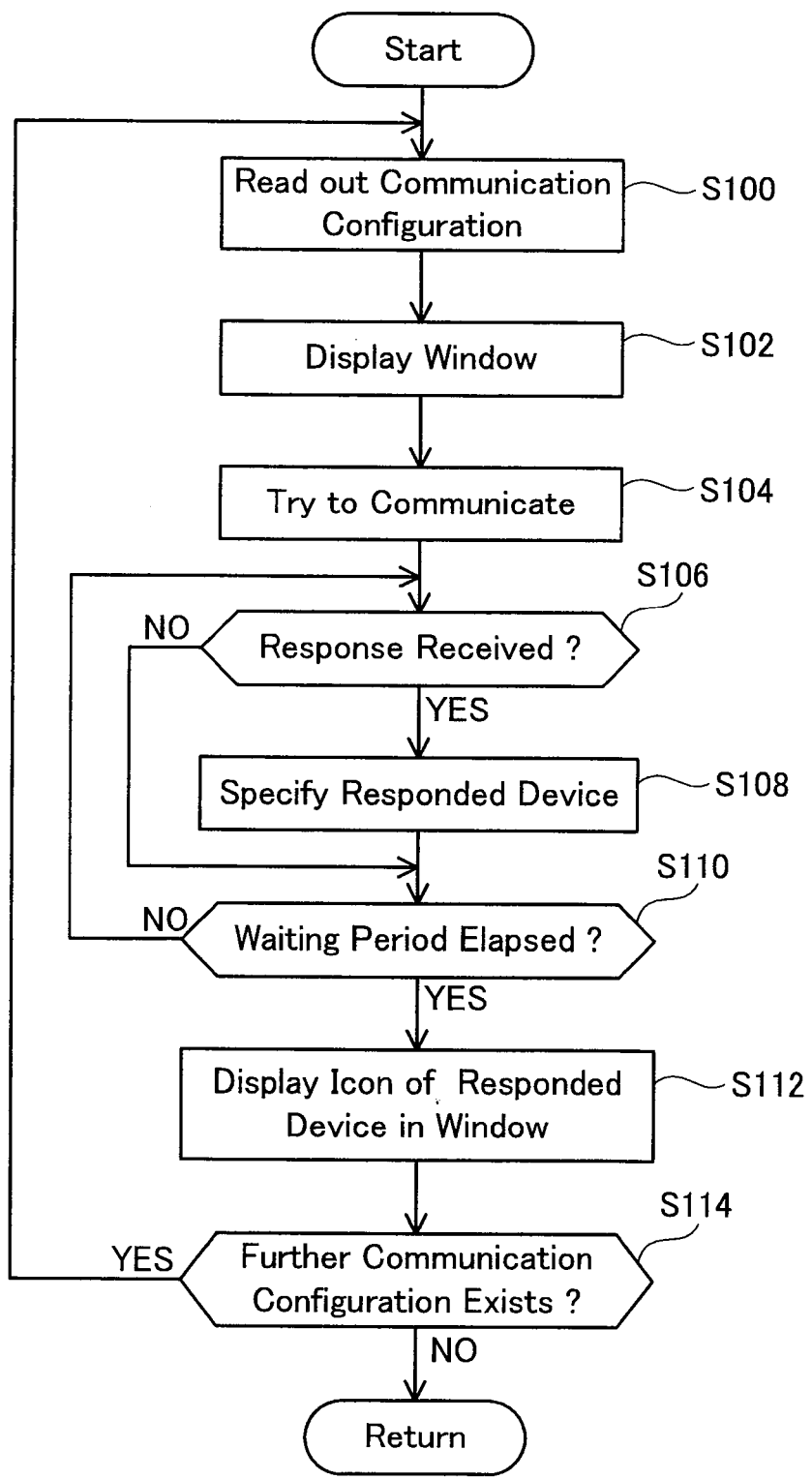
FIG. 2 is a flow chart showing a device searching and displaying process.
Figure 3:
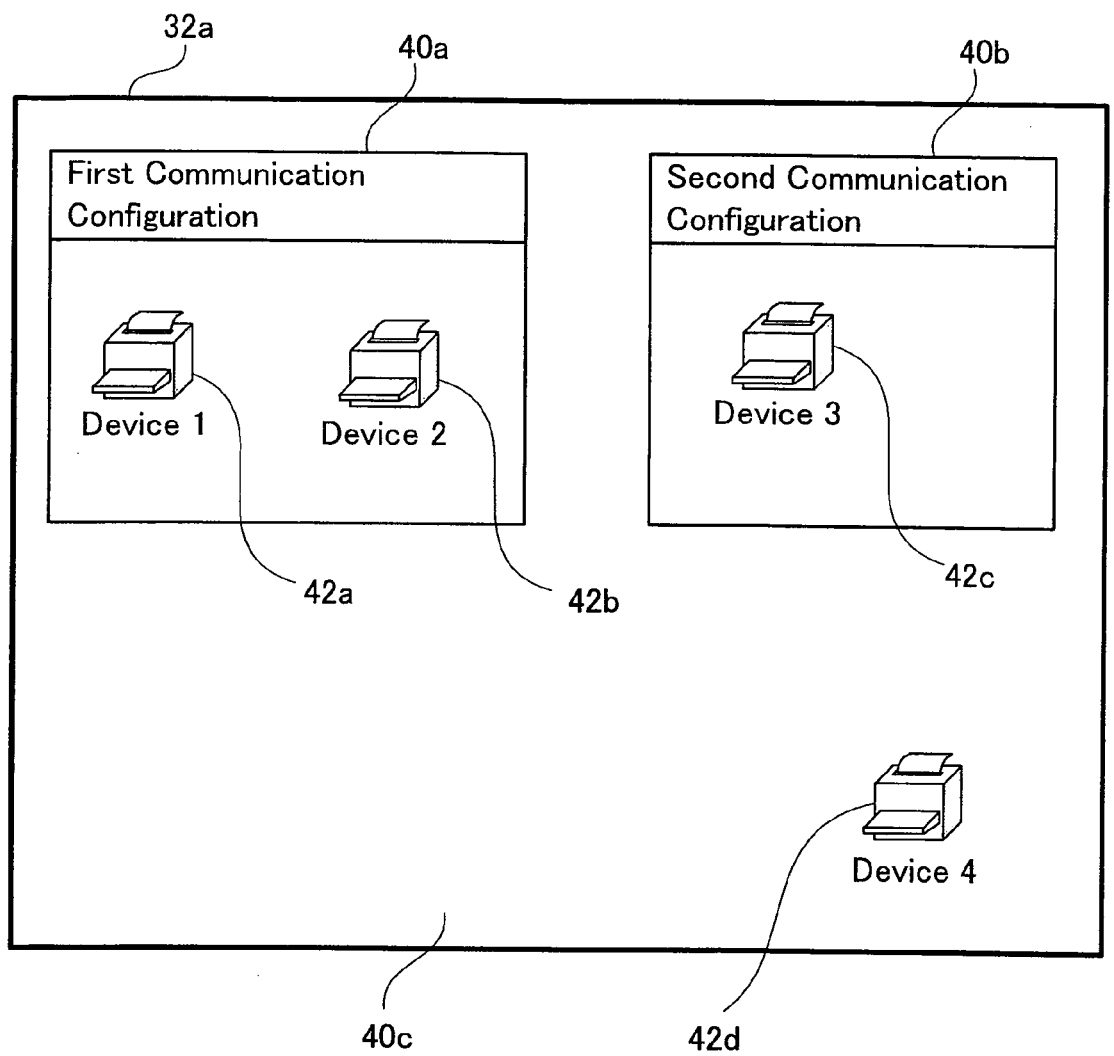
FIG. 3 is an example of a screen of a managing apparatus.

The management program 16 periodically carries out a device searching process. In the device searching process, a device having a specific communication configuration is specified among many devices connected to the network, and then the specified devices are grouped in accordance with the communication configuration and accordingly displayed on the display 32. FIG. 2 shows a flow chart of the device searching and displaying process. FIG. 3 shows an example of screen 32a which is displayed on the display 32 whereas resulting from the device searching and displaying process.

In this embodiment, a case in which the first communication configuration is set at the device 1 and the device 2, and the second communication configuration is set at the device 3 is exemplified. In the managing apparatus 10, the first communication configuration is described in the first configuration file 20. The second communication configuration is described in the second configuration file 22. The first and second communication configurations are different from each other. Furthermore, a third communication configuration which differs from the first communication configuration and the second communication configuration is set at the device 4. The third communication configuration is the same as a communication configuration which is described in the default configuration file 24 stored in the managing apparatus 10. Further at the device 5, a communication configuration which differs from all of these first to third communication configurations is set. Since the user of the managing apparatus 10 does not know the communication configuration being set at the device 5, no configuration file in which the communication configuration set at the device 5 is described is initially prepared by the user. In other words, the configuration file in which the communication configuration enabling the communication with the device 5 is described is not stored in the storage 14.

When the managing apparatus 10 carries out the device searching process, multiple areas are displayed on the display 32. These areas are displayed in the form of different windows. The number of the windows corresponds to the number of the configuration files stored in the storage 14. Each of the windows is linked to a communication configuration of each configuration file. Specifically, in this embodiment, a first window 40a (refer to FIG. 3) which is linked to the first communication configuration and a second window 40b which is linked to the second communication configuration are displayed. Note that an area 40c other than the first window 40a and the second window 40b is displayed as a display area which is linked to the default communication configuration of the managing apparatus 10.

At Step 100, the managing apparatus 10 reads out, from one of the configuration files stored (for example, the first configuration file 20), a communication configuration (e.g. first communication configuration). The managing apparatus 10 displays the first window 40a which is linked to the read-out, first communication configuration (Step 102). The managing apparatus 10 carries out a communication trial in accordance with the read-out first communication configuration (Step 104). The "communication trial" may be referred to as "sending a command that requests a device to make a response in accordance with the established communication configuration". The communication configuration conforms to SNMPv3 that is adopted for communication between the device management apparatus and the device. Detailed description of the communication configuration and the procedure of the communication trial are omitted for they are defined in the SNMPv3 standard.

Then, the managing apparatus 10 waits for a response from a device for a predetermined period (waiting period, at Step 106 and Step 110). The device 1 and device 2, since the first communication configuration is set at these devices, respond to the communication trial executed at Step 104.

The managing apparatus 10, when having received a response from one of the devices within the waiting period (YES at Step 106), specifies the device which has made the response (at Step 108). In the present embodiment, two devices, namely device 1 and device 2, are specified within the waiting period. Response data from each of the respondent device includes an IP address and a name of the respondent device. The managing apparatus 10 can specify the respondent device based on these IP address and name included in the response. The managing apparatus 10 specifies that, from the response data of the device 1, the name of the respondent device is "device 1". Similarly, the managing apparatus 10 specifies that, from the response data of the device 2, the name of the other respondent device "device 2."

After the waiting period has elapsed (YES at Step 110), the managing apparatus 10 displays an icon (symbol image) representing the specified device (device 1 or device 2) on the first window displayed at Step 102 (Step 112). In other words, the managing apparatus 10 displays a window which is linked to the read communication configuration (Step 102), specifies a device which has made a response to the communication trial made with the read communication configuration (Step 108), and displays an icon representing the specified device in a window (Step 112). Resulting from the execution of Step 112, icon 42a representing the device 1 and icon 42b representing the device 2 are displayed in the first window 40a of the screen 32a, as shown in FIG. 3. The icon 42a representing the device 1 is an image containing a letter string of "Device 1." Because of the letter string of "Device 1" contained in the symbol image, the user can easily recognize that the icon 42a represents the device 1.

The managing apparatus 10 repeats the above-described process on all the configuration files stored in the storage 14 (YES at Step 114). Specifically, after having executed the above-described process using the first communication configuration, the managing apparatus 10 then repeats the above-described process on the second communication configuration which is described in the second configuration file 22. As a result, the second window 40b which is linked to the second communication configuration is displayed as shown in FIG. 3. In the second window 40b, the icon 42c representing the device 3 which has made a response to the communication trial that had been made with the second communication configuration is displayed.

Subsequently, the managing apparatus 10 carries out the above-described process on the default communication configuration which is written in the default configuration file 24 stored in the storage 14. As a result, the icon 42d representing the device 4 which has made a response to the communication trial that had been made with the default communication configuration, namely, to the third communication configuration, is displayed in the display area 40c as shown in FIG. 3. When the device searching process for each and every communication configurations is completed, a negative judgment is made at Step 114, and then the process is terminated. As described above, the managing apparatus 10 repeats the communication trial on all the different communication configurations stored, and displays the icons representing the devices which have made responses to the communication trials made with the respective communication configurations in the areas being linked to the respective communication configurations.

The screen of FIG. 3 can be obtained by the process shown in FIG. 2. As clearly shown on the screen 32a, the managing apparatus 10 displays devices in a manner that devices having the same communication configuration are grouped. Because of the screen 32a, the user of the managing apparatus 10 can immediately recognize the devices that sets the same communication configuration. Meanwhile, the device 5 which has not yet been subjected to the management is not displayed in any display area. Therefore, only the devices to be managed by the user are displayed in any one of the display areas. Thus, the managing apparatus 10 facilitates the management of a plurality of devices subjected to the management. The user can recognize, at a glance, the communication configurations set at the respective devices, since icons of the respective devices are displayed in group in accordance with communication configurations.

Figure 4:
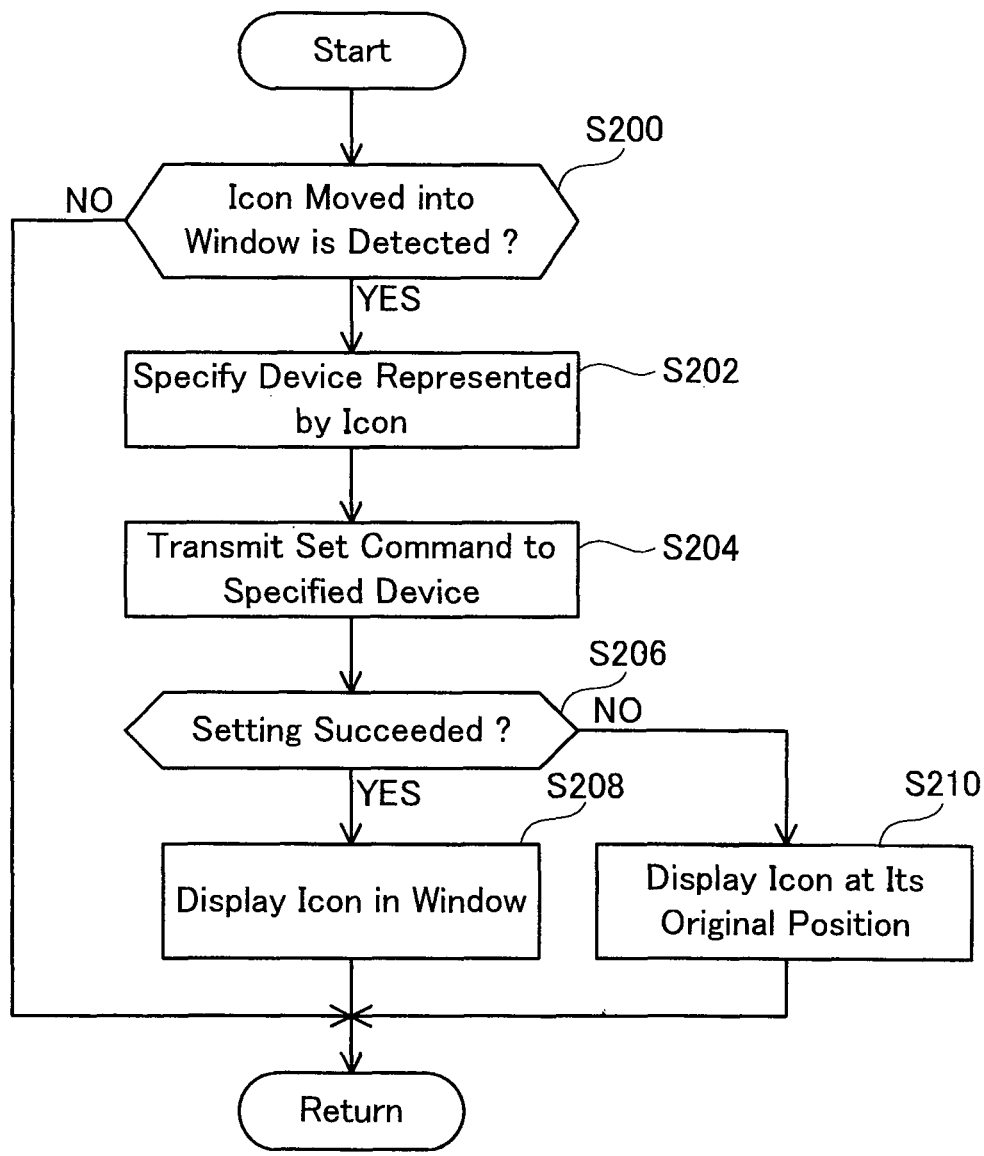
FIG. 4 is a flow chart showing a communication configuration changing process (movement of an icon).

Next, the process of changing the communication configuration of a specified device to be carried out by the managing apparatus 10 will be described. FIG. 4 shows a flow chart of the process of changing a communication configuration carried out in relation to the movement of an icon. The managing apparatus 10 constantly monitors the movement of icons on the screen caused by the user (Step 200). The managing apparatus 10 may receive the user's instructions to move a device icon (for example, device icon 42a) displayed in a window (for example, the first window 40a) to another window (for example, to the second window 40b). Upon receiving the user's instructions (YES at Step 200), the managing apparatus 10 specifies the device which is represented by the device icon 42a designated by the user (Step 202). The device icon 42a represents the device 1.

The managing apparatus 10 transmits, in accordance with the first communication configuration which enables the communication with the device 1, to the specified device (i.e. device 1) a set command that requests the specified device to set the second communication configuration that is linked to the second window 40b (Step 204). The device 1, which has received the set command, sets the second communication configuration at the device itself in accordance with the command. Then, the managing apparatus 10 tries to communicate with the device 1 with the communication configuration that is specified in the set command, namely the second communication configuration. The managing apparatus 10 makes a judgment whether configuration change has succeeded by monitoring the response from the device 1 using the second communication configuration. If there is no response from the device 1, the managing apparatus 10 makes a judgment that the configuration change has not been successful (NO at Step 206). In a case where the setting is successful (YES at Step 206), the managing apparatus 10 displays the device icon 42a representing the device 1 in the second window 40b (at Step 208). In a case where the setting is not successful (NO at Step 206), the managing apparatus 10 displays the device icon 42a at the original position (at Step 210). In other words, the managing apparatus 10 in this case, although receiving the user's instructions to move the device icon 42a to the inside of the second window 40a, displays the device icon 42a at the original position. It should be noted that at Step 206, the managing apparatus 10 makes a judgment that the configuration change has not been successful in a case where there is no response from the device 1. Alternatively, in a case where there is no response from the device 1 within a predetermined period, for example, the managing apparatus 10 may determine the failure of configuration change by trying to communicate with the device 1 after switching the communication configuration of the managing apparatus 10 itself to the first communication configuration (communication configuration of the device 1 prior to the change), and make communication trial accordingly.

The managing apparatus 10 carries out a similar process, also in the case where the managing apparatus 10 receives user's instructions to move the device icon 42c, which is displayed in the second window 40b, to the inside of the first window 40a. Further, the managing apparatus 10 carries out a similar process, also in the case where the managing apparatus 10 receives user's instructions to move the device icon 42d, which is displayed outside the first window 40a, to the inside of the second window 40b.

In order to set the desired communication configuration in the device represented by the icon, the user simply needs to move the icon representing the device to a window which is linked to the desired communication configuration. The user can change the communication configuration of the device merely by moving the icon.

Figure 5:
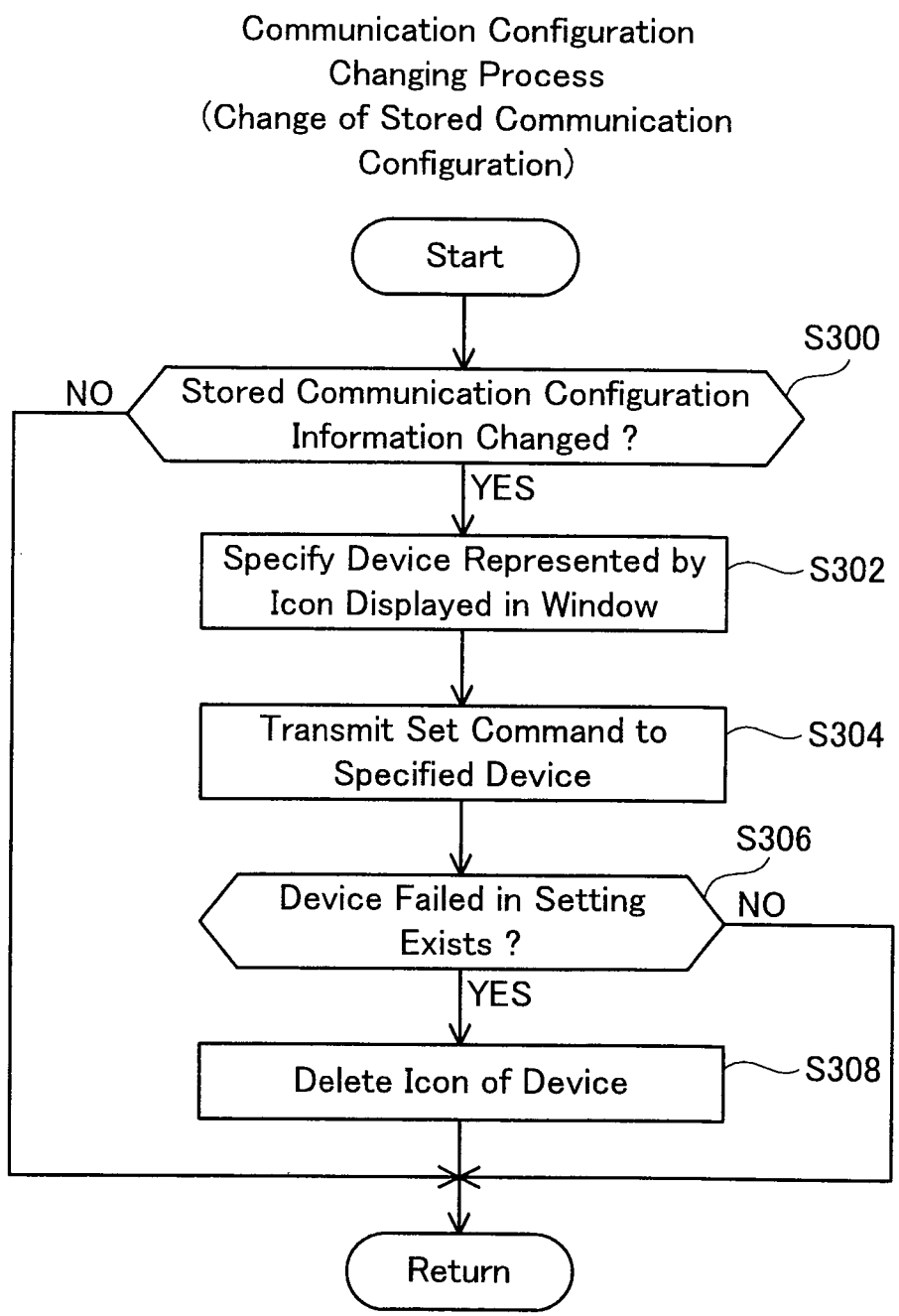
FIG. 5 is a flow chart showing a communication configuration changing process (change of the stored communication configuration).

Next, the process of collectively changing communication configuration of plurality of devices at which the same communication configuration is set, which is carried out by the managing apparatus 10 will be described. FIG. 5 shows a flow chart of the process of a communication configuration change for changing the stored communication configuration.

The managing apparatus 10 monitors whether or not the stored configuration files are edited by the user (Step 300). Now, a case in which the user edits the first communication configuration (communication configuration which is written into the first configuration file 20) linked to the first window 40a is assumed. The managing apparatus 10 detects that the first communication configuration described in the first configuration file 20 has been edited (YES at Step 300). The managing apparatus 10 specifies devices which are represented by the device icons displayed in the first window 40a being linked to the first configuration file (Step 302). A set command that requests a device to change the communication configuration into the edited configuration is transmitted to each of the specified devices (Step 304). The device (namely, device 1 and device 2), which has received the set command, sets the edited communication configuration at the device itself in accordance with the set command.

Next, the managing apparatus 10 determines whether or not the device to which the set command was transmitted has succeeded in setting the edited communication configuration (Step 306). This determination is performed as follows. The managing apparatus 10 tries to communicate with each of the devices to which the communication command has been transmitted in accordance with the edited communication configuration. In a case where the device makes a response to the communication trial, the managing apparatus 10 determines that the device has succeeded in changing its configuration. In a case where the device does not respond to the communication trial, the managing apparatus 10 determines that the device has not succeeded in changing its configuration. The managing apparatus 10, when detecting the device which has not succeeded in setting (YES at Step 306), deletes the icon representing the device from the first window 40a (Step 308). By the processes described above, the managing apparatus 10 (that is, the user of the managing apparatus 10) can collectively change the communication configuration in the devices at which the same communication configuration is set.

Figure 6:
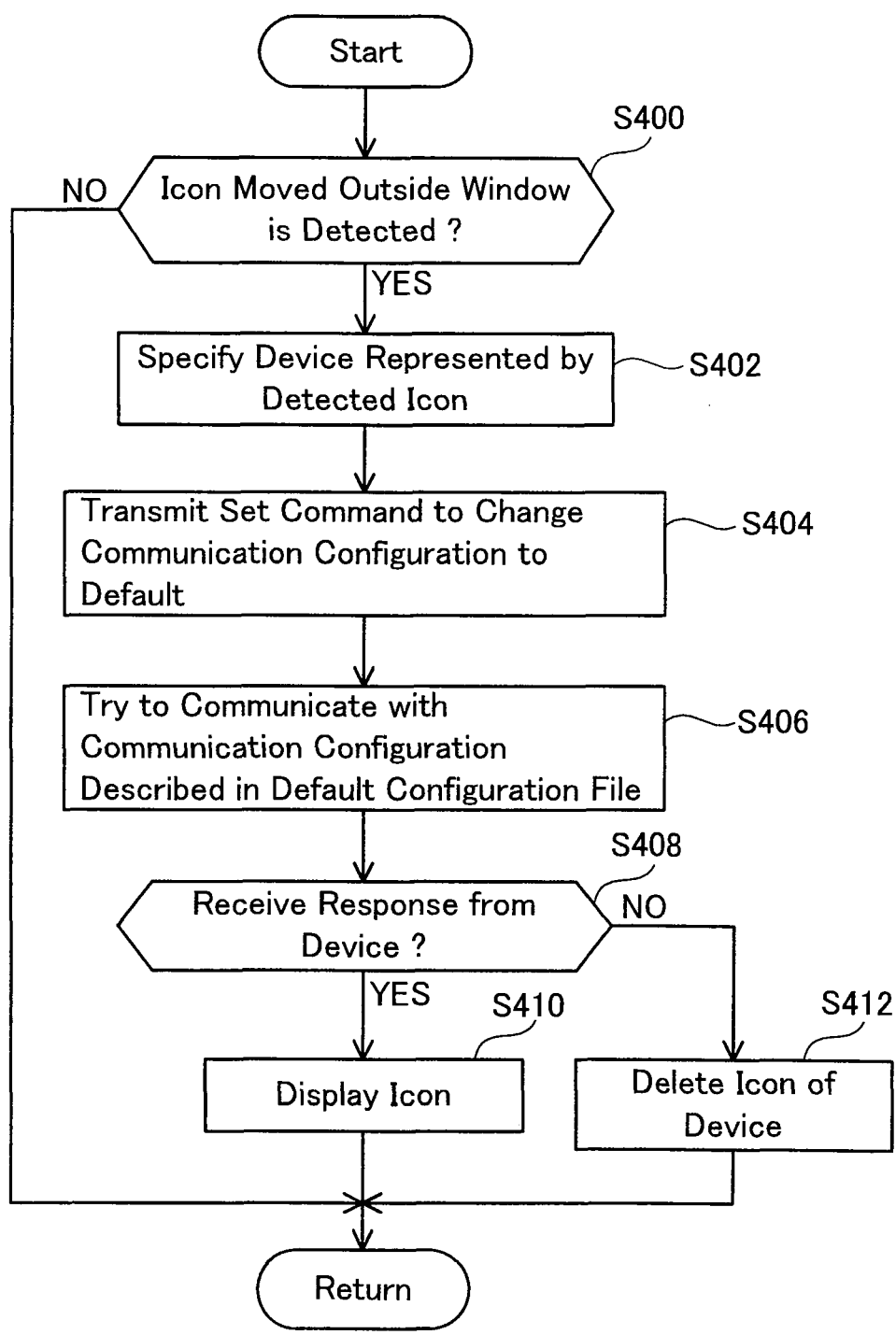
FIG. 6 is a flow chart showing a changing process to a default communication configuration.

Next, the process of causing the device to set the default communication configuration carried out by the managing apparatus 10 will be described. FIG. 6 shows a flow chart of the process of changing the communication configuration of each device into its own default communication configuration stored in the device. Each device stores its own default communication configuration which may be set at the device itself. The own default communication configuration is stored, for example, in a ROM of each device at the time of factory shipment. Now, a case such that the user gives the managing apparatus 10 instructions to move a symbol image (for example, the device icon 42a) displayed in one of the areas (for example, the first window 40a) to the area 40c is assumed.

When receiving user's instructions, the managing apparatus 10 detects the device icon which is to be moved as instructed by the user. In this example, the device icon 42a is instructed to move outside the window at Step 400. Then, the managing apparatus 10 specifies the device which is represented by the device icon 42a (Step 402). In this example, the device icon 42a represents the device 1. The managing apparatus 10 transmits a set command to the device 1 in accordance with the communication configuration (first communication configuration) which is originally set at the device 1 (Step 404). The set command to be transmitted this time is a command that requests the specified device (device 1) to set its own default communication configuration stored in the device.

The device 1 sets the own default communication configuration stored in the device 1 in response to the set command. Then, the managing apparatus 10 tries to communicate with the device 1 with the default communication configuration (communication configuration which is written into the default communication file 24) of the managing apparatus 10 (Step 406). This is because there is a possibility that the own default communication configuration of the device 1 corresponds to the default communication configuration of the managing apparatus 10. If the managing apparatus 10 receives a response to the communication trial from the device 1, the managing apparatus 10 will determine that the own default communication configuration of the device 1 corresponds to the default communication configuration of the managing apparatus 10 (YES at Step 408). In this case, the managing apparatus 10 displays the device icon 42a of the device 1 in the area 40c (at Step 410). On the other hand, if the managing apparatus 10 does not receive a response to the communication trial from the device 1, the managing apparatus 10 will determine that the own default communication configuration of the device 1 is different from the default communication configuration of the managing apparatus 10 (NO at Step 408). In this case, the managing apparatus 10 does not display the device icon 42a of the device 1 in any of the areas. In other words, the managing apparatus 10 deletes the device icon 42a from the screen (Step 412). The above-described process means that the managing apparatus 10 eliminates the device 1 from the subjects of the management. In order to add the device 1 to be under subject of the management again, the managing apparatus 10 starts the process of setting a known communication configuration to the device 1.

Only by moving an icon representing a device, the managing apparatus 10 (and its user) can set the own default communication configuration at the device. Further, in a case where the own default communication configuration of the device is different from the default communication configuration of the managing apparatus 10, the managing apparatus 10 deletes the device icon being linked to the device from the screen. In this case, the user can easily recognize, at a glance of the screen, that the device has been eliminated from the objects of the management.

Figure 7:
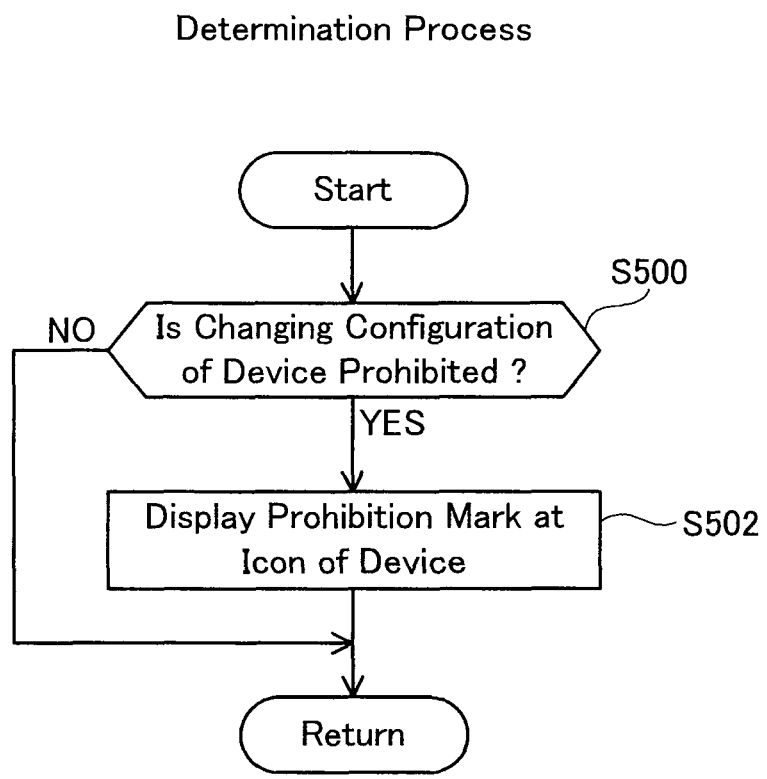
FIG. 7 is a flow chart showing a determination process.

The determination process carried out by the managing apparatus 10 will be described below. This process is carried out subsequently to the process at Step 108 shown in FIG. 2. In this process, whether or not the change of the communication configuration made by the user has been allowed by each device is determined. FIG. 7 shows a flow chart of the determination process.

The managing apparatus 10 inquires to the device specified at Step 108 whether or not the change of communication configuration has been allowed (Step 500). In reply to the inquiry, the device transmits to the managing apparatus 10 a message as to whether or not the change in communication configuration had been allowed. The managing apparatus 10, when receiving a message that the change of communication configuration has not been allowed (an affirmative judgment is made at Step 500), carries out the process at Step 502. On the other hand, the managing apparatus 10, when receiving a message that the change of communication configuration has been allowed (a negative judgment is made at Step 500), terminates the determination process.

Figure 8:
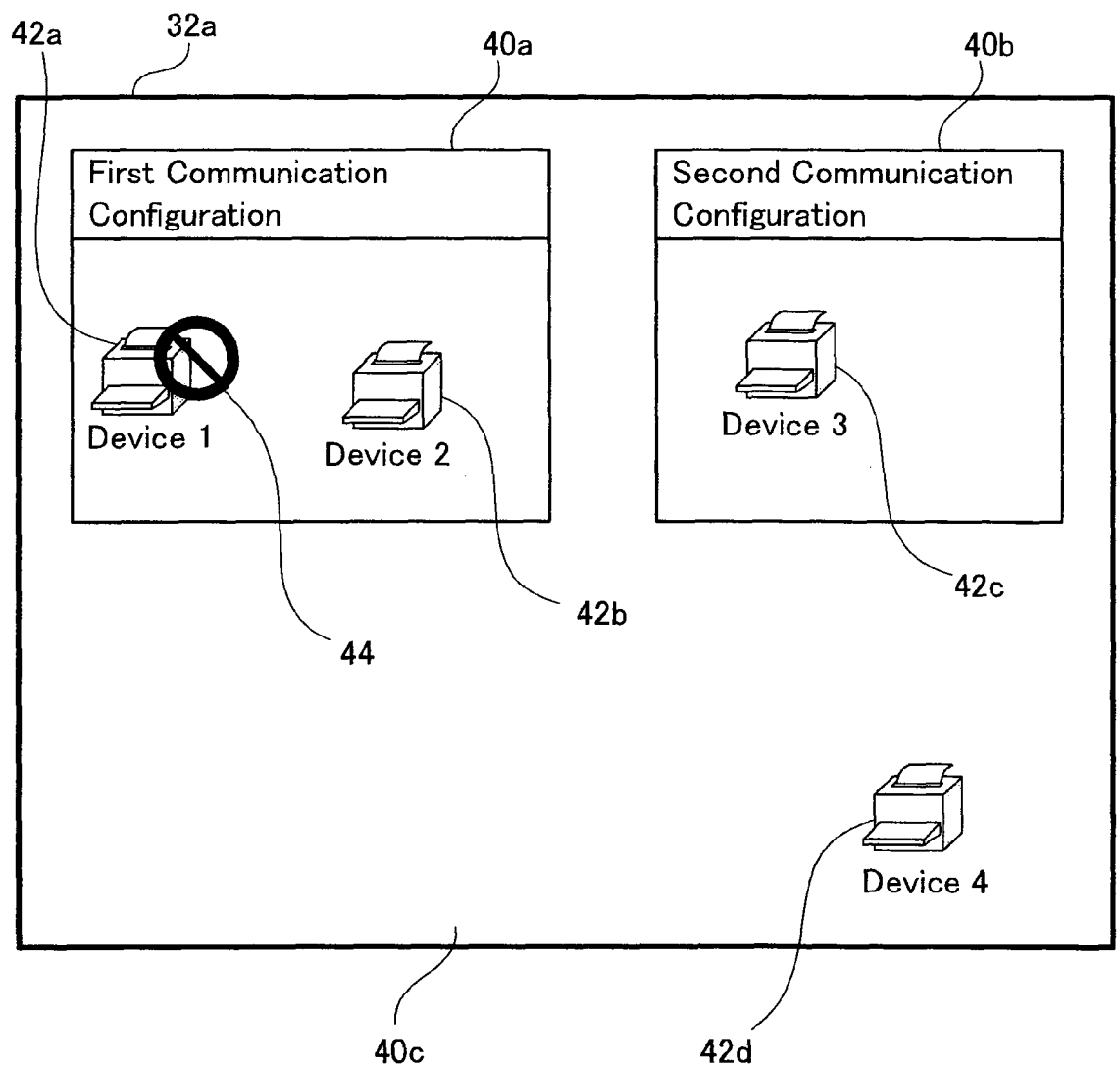
FIG. 8 shows another example of a screen.

At Step 502, the managing apparatus 10 adds a mark representing prohibition of changing communication configuration to the icon displayed at Step 112 (i.e. the icon representing the device specified at Step 108). FIG. 8 shows an example of the screen 32a after the determination process is completed. As shown in FIG. 8, a mark 44 representing the change-prohibition is added to the icon 42a representing the device 1. By adding the mark 44 representing the change-prohibition, the user can recognize, at a glance, whether or not the configuration change is allowed to each device.

Some of technical features of the embodiment will be listed below. It is preferable that the controller of the managing apparatus described above, when receiving a move command to move a symbol image, which is displayed in an first area being linked to a first communication configuration, to inside a second area being linked to a second communication configuration, transmits to the device that the symbol image represents a set command that requests the device to set the second communication configuration. The "move command" typically corresponds to so-called "drag and drop" operation. Because of such technical features, the user can easily change the communication configuration of the device, simply by moving the symbol image of the device to a display area being linked to the desired communication configuration.

It is preferable that, when one of the stored communication configurations is edited or modified, the controller transmits a set command that requests the device to set the edited communication configuration to the device whose symbol image is displayed in the area being linked to the edited communication configuration. Such technical features enables collective change of the communication configurations of multiple devices which are represented by symbol images displayed in the area.

It is preferable that when the controller receives instructions to move a symbol image displayed in a display area being linked to a communication configuration to another area which is not linked to any of the communication configurations, the controller transmits to the device, which is represented by the symbol image moved, a set command to set the own default communication configuration stored in the device. Note that "another area which is not linked to any of the communication configurations" may be a display area which is not any of the multiple display areas displayed by the controller. Or, it may be a window displayed by the controller in addition to the window being linked to the communication configuration. The "own default communication configuration" may typically be a communication configuration which is initially stored in an individual device. Because of such technical features, the managing apparatus can easily set the own default communication configuration stored in the device itself.

Further, the managing apparatus can also change the communication configuration of the device simply by moving the displayed symbol image to the specified area. Furthermore, simply by editing the communication configuration being linked to an area, the communication configurations of the devices displayed in the area can collectively and accordingly be changed. Thus, the managing apparatus disclosed in this specification can visually manage a plurality of devices at which different communication configurations are set, by means of multiple areas grouped in accordance with respective communication configurations and symbol images displayed in the areas.

Preferred modifications of the embodiment described above will be described below. For example, a device searching or a displaying process does not always have to be activated. The process may be activated in a case where connection of a new device is detected. The connection of a new device can be detected by means of a communication protocol without a communication configuration. Such a process is defined in SNMP, for example.

In a case where a device icon corresponding to a device at which the default communication configuration is to be set is moved to the display area 40c corresponding to the default communication configuration of the managing apparatus 10, the managing apparatus 10 according to the above embodiment causes the device to set its own default communication configuration. Alternatively, the managing apparatus 10 may set, by the following process in place of such a process, the own default communication configuration at the device. The managing apparatus 10 displays a specified icon (for example, an icon representing a trash box) on the screen. The managing apparatus 10, when receiving instructions to move the device icon onto the specified icon, transmits to the device represented by that device icon a command that requests the device to set the own default communication configuration.

Further, it is preferable that the managing apparatus 10 may provide on a screen a default display area to display a device icon representing a device of which communication configuration is the own default communication configuration as one of the areas to be displayed on the screen. In this case, the storage 14 of the managing apparatus 10 further stores a device default configuration file in which the own default communication configuration of each of the devices connected to a network is described. As shown in FIG. 2, the managing apparatus 10, after the communication trials with the first configuration file, the second configuration file, and the like and the communication configurations stored in the default configuration file, makes the respective communication trials with the default communication configurations of all the devices which are described in the device default configuration file. Then, the managing apparatus 10 displays in the default display area the device icon of the device which has made a response to the communication trial with the default communication configuration of any one of the devices. Because of such a process, the user can easily recognize, at a glance of the screen, the device at which any communication configuration has not yet been set. In a case where such a default display area is provided, when a device receives instructions to set the default communication configuration transmitted from the managing apparatus 10, a device icon representing the device is displayed in the default display area. Note that, although all of the icons representing the devices at which the default communication configurations are set are displayed in a single default display area herein, these icons may be grouped in different display areas for respective communication configurations.

In the embodiments, mutual communications are carried out based on the SNMPv3 protocol. In place of such a protocol, communication may be carried out in accordance with a communication protocol of lower-level than the SNMPv3, such as a SNMPv1. In this case, however, a security level of the communication using the SNMPv1 is not so high as that of the communication in accordance with the SNMPv3. Therefore, in order to operate this management program under higher security, the managing apparatus may not display a device configured to communicate in accordance with the communication protocol SNMPv1 in any display area.

Since a device which operates in accordance with the SNMPv1 is not displayed in any display area, a user can neither move a device icon nor set a new communication configuration at the device. As in this embodiment, in a case where a new communication configuration is set at a device corresponding to the device icon by moving a device icon, a new communication configuration has to be transmitted to the device in accordance with a communication configuration set at the device. In other words, a communication configuration required for the communication protocol SNMPv3 (for example, a communication configuration which includes highly confidential information like an authentication key) is transmitted to the device at which the SNMPv1 is set, using the communication protocol SNMPv1. As to the device which is configured to communicate in accordance with the communication protocol SNMPv1, problems on security as described above can be prevented by prohibiting displaying the device icon.

Additionally, as to the device at which the SNMPv1 is set, a device icon representing the device is displayed in the corresponding display area by changing the communication protocol from the SNMPv1 to the SNMPv3. Further, a device of which communication protocol is changed to the SNMPv1, even in the case where a default display area is provided as described above, is not allowed to be displayed in the default display area as long as the default communication is set at the device.

The specific embodiments of the present invention are described above, but these merely illustrate some possibilities of the invention and do not restrict the claims thereof. The art set forth in the claims includes transformations and modifications to the specific examples set forth above. The technical elements disclosed in the specification or the drawings may be utilized separately or in all types of combinations, and are not limited to the combinations set forth in the claims at the time of filing of the application. Furthermore, the art disclosed herein may be utilized to simultaneously realize a plurality of aims or to realize one of these aims.

What is claimed is:

1. A device managing apparatus comprising:
   a storage configured to store different communication configurations; and
   a controller for communicating with each of a plurality of devices,
   wherein the device managing apparatus, upon execution of one or more computer readable instructions, performs steps of:
      repeating a communication trial toward each of the plurality of devices using one of the stored communication configurations, wherein a communication configuration to be used is changed for each repetition of the communication trial;
      monitoring a response sent to the device managing apparatus from each of the plurality of devices when a repetition of the communication trial has succeeded;
      displaying a plurality of visually delineated areas, each of the plurality of visually delineated areas being linked to a corresponding one of the stored communication configurations;
      automatically arranging, without user input, each of a plurality of symbol images into a corresponding visually delineated area wherein:
         the each of the plurality of symbol images corresponds to a device that has responded to a repetition of the communication trial; and
         the corresponding visually delineated area is linked to the communication configuration used for a corresponding successful repetition of the communication trial;
      receiving a request to move a symbol image representing one of the plurality of devices from a first visually delineated area to a second visually delineated area, wherein the first visually delineated area is linked to a first communication configuration and the second visually delineated area is linked to a second communication configuration;
      in response to the request, sending a command to the one of the plurality of devices represented by the symbol image to be moved, the command requesting the one of the plurality of devices to set the second communication configuration; and
      adding the symbol image representing the one of the plurality of devices to the second visually delineated area,
      wherein each of the plurality of visually delineated areas indicates that all devices within the respective visually delineated area is set with a corresponding one of the communication configurations linked to the respective visually delineated area.

2. The device managing apparatus of claim 1, wherein, when the device managing apparatus receives a command for modifying a stored communication configuration corresponding to one of the plurality of visually delineated areas, the device managing apparatus modifies the communication configuration of devices corresponding to one or more displayed symbol images in the corresponding one of the plurality of visually delineated areas.

3. The device managing apparatus of claim 1, wherein, when the device managing apparatus receives a move command to move a symbol image displayed in one of the visually delineated areas to an additional area that is not linked to any stored communication configuration, the device managing apparatus sends, to the device represented by the symbol image, a set command that requests the device to set a default communication configuration stored in the device.

4. The device managing apparatus of claim 3, wherein the device managing apparatus, upon execution of the one or more computer readable instructions, is further caused to move the symbol image to the additional area when the device has succeeded in setting the default communication configuration.

5. The device managing apparatus of claim 3, wherein the device managing apparatus, upon execution of the one or more computer readable instructions, is further caused to delete the symbol image being displayed when the device has not succeeded in setting the default communication configuration.

6. The device managing apparatus of claim 1, wherein at least one of the communication configuration conforms to SNMPv3 that is adopted for communication between the device managing apparatus and the device.

7. A non-transitory computer readable medium storing computer readable instructions that, when executed, cause a device managing apparatus to perform:
repeating a communication trial toward each of a plurality of devices using one of a plurality of communication configurations stored in the device managing apparatus, wherein the one of the communication configurations to be used is changed for each repetition of the communication trial, and wherein the device managing apparatus is configured to manage the device through a network;
monitoring a response sent to the device managing apparatus from each of the plurality of devices when a repetition of the communication trial has succeeded;
displaying a plurality of visually delineated areas, each of which is linked to a corresponding one of the stored communication configurations;
automatically arranging, without user input, each of a plurality of symbol images into a corresponding visually delineated area wherein:
the each of the plurality of symbol images corresponds to a device that has responded to a repetition of the communication trial; and
the corresponding visually delineated area is linked to the communication configuration used for a corresponding successful repetition of the communication trial,
wherein each of the plurality of visually delineated areas indicates that all devices within the respective visually delineated area is set with a corresponding one of the communication configurations linked to the respective visually delineated area;
receive a request to move a symbol image representing one of the plurality of devices from a first visually delineated area to a second visually delineated area, wherein the first visually delineated area is linked to a first communication configuration and the second visually delineated area is linked to a second communication configuration;
in response to the request, send a command to the one of the plurality of devices represented by the symbol image to be moved, the command requesting the one of the plurality of devices to set the second communication configuration; and
add the symbol image representing the one of the plurality of devices to the second visually delineated area.

8. The non-transitory computer readable medium of claim 7, wherein the computer readable instructions, when executed, further cause the device managing apparatus to perform, when the device managing apparatus receives a command for modifying a stored communication configuration corresponding to one of the plurality of visually delineated areas, modifying the communication configuration of devices corresponding to one or more symbol images displayed in the one of the plurality of visually delineated areas.

9. The non-transitory computer readable medium of claim 7, wherein the computer readable instructions, when executed, further cause the device managing apparatus to perform, when the device managing apparatus receives a move command to move a symbol image displayed in one of the visually delineated areas to an additional area that is not linked to any stored communication configuration, sending, to the device represented by the symbol image, a set command requesting the device to set a default communication configuration stored in the device.

10. The non-transitory computer readable medium of claim 9, wherein the computer readable instructions, when executed, further cause the device managing apparatus to perform moving the symbol image to the additional area when the corresponding device has succeeded in setting the default communication configuration.

11. The non-transitory computer readable medium of claim 9, wherein the computer readable instructions, when executed, further cause the device managing apparatus to perform deleting the symbol image being displayed when the corresponding device has not succeeded in setting the default communication configuration.

12. The computer readable medium of claim 7, wherein at least one of the stored communication configurations conforms to SNMPv3 that is adopted for communication between the device managing apparatus and the device.

* * * * *